United States Patent
Etori

(10) Patent No.: US 8,121,772 B2
(45) Date of Patent: Feb. 21, 2012

(54) HEADWAY DISTANCE MAINTENANCE SUPPORTING DEVICE AND METHOD

(75) Inventor: Nariaki Etori, Machida (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 630 days.

(21) Appl. No.: 12/254,418

(22) Filed: Oct. 20, 2008

(65) Prior Publication Data

US 2009/0105923 A1 Apr. 23, 2009

(30) Foreign Application Priority Data

Oct. 23, 2007 (JP) ................................ 2007-275678
Jul. 1, 2008 (JP) ................................ 2008-172481

(51) Int. Cl.
*B60T 7/12* (2006.01)
*G06F 19/00* (2006.01)

(52) U.S. Cl. ............ 701/96; 701/93; 701/301; 340/903; 180/169

(58) Field of Classification Search ............... 701/96, 701/301, 93, 300; 340/903, 435, 436; 180/169, 180/170, 171
See application file for complete search history.

(56) References Cited

U.S. PATENT DOCUMENTS

| | | | |
|---|---|---|---|
| 6,351,702 B1 * | 2/2002 | Tange et al. ............... | 701/96 |
| 6,658,344 B2 * | 12/2003 | Hirasago ..................... | 701/96 |
| 7,099,766 B2 * | 8/2006 | Michi et al. ................ | 701/96 |
| 7,107,138 B2 * | 9/2006 | Currie ........................ | 701/79 |
| 7,151,993 B2 * | 12/2006 | Terada ........................ | 701/93 |
| 2001/0044692 A1 * | 11/2001 | Isogai et al. ............... | 701/96 |
| 2003/0173128 A1 | 9/2003 | Kuroda et al. | |
| 2005/0125137 A1 | 6/2005 | Shiba et al. | |
| 2006/0265115 A1 * | 11/2006 | Etori et al. ................. | 701/96 |
| 2007/0276577 A1 | 11/2007 | Kuge et al. | |
| 2008/0133103 A1 | 6/2008 | Meske et al. | |

FOREIGN PATENT DOCUMENTS

| | | |
|---|---|---|
| DE | 10 2005 038 489 A1 | 2/2007 |
| EP | 1 065 089 A2 | 1/2001 |
| EP | 1 065 090 B1 | 1/2001 |
| EP | 1 070 624 B1 | 1/2001 |
| JP | 2005-329786 A | 12/2005 |
| JP | 2007-313932 A | 12/2007 |

OTHER PUBLICATIONS

Nissan Motor Company, "Safety Activities Technology Overview, Nissan's Approach to Safety", Aug. 2006.

* cited by examiner

*Primary Examiner* — Tan Q Nguyen
(74) *Attorney, Agent, or Firm* — Foley & Lardner LLP

(57) ABSTRACT

A headway distance maintenance supporting system may include a running controller for performing constant headway distance control, a deceleration controller for performing deceleration support control, a transitional state detector for detecting transitional states of said given vehicle based on the running environment of said given vehicle or the operations performed by the driver. The system controller is configured such that when said transitional state detector detects that the transitional state of said given vehicle is a prescribed transitional state, said running controller is controlled such that said constant headway distance control is released, and said deceleration controller is controlled such that said deceleration support control can be performed.

14 Claims, 10 Drawing Sheets

HEADWAY DISTANCE MAINTENANCE SUPPORTING DEVICE AND METHOD

CROSS-REFERENCE TO RELATED APPLICATIONS

This application claims priority from Japanese Patent Application Serial No. 2007-275678, filed Oct. 23, 2007, and Japanese Patent Application Serial No. 2008-172481, filed on Jul. 1, 2008, each of which is incorporated herein by reference in its entirety.

TECHNICAL FIELD

The present invention pertains to a technology for supporting maintenance of a headway distance.

BACKGROUND

A system for performing acceleration/deceleration control of a given vehicle such that the vehicle follows a preceding vehicle while the headway distance from the preceding vehicle is kept constant is described in Japanese Kokai Patent Application No. 2005-329786. Additionally, there is also a system for performing deceleration control of the given vehicle based on the detected headway distance such that the headway distance from the preceding vehicle is guaranteed. A type of vehicle equipped with plural systems for performing the deceleration control as aforementioned is described in Japanese Kokai Patent Application No. 2007-313932.

SUMMARY

Disclosed herein is a headway distance maintenance supporting system for a given vehicle that provides an improved support running of a given vehicle. According to one embodiment of the present invention, a headway distance maintenance supporting system may include a running controller for performing constant headway distance control for following a preceding vehicle when a preceding vehicle is present, a deceleration controller for performing deceleration support control that supports deceleration of said given vehicle corresponding to a headway distance from said preceding vehicle, a running environment detector for detecting a running environment of said given vehicle, an operation detector for detecting operations performed by the driver for adapting to the running environment of said given vehicle, a transitional state detector for detecting transitional states of said given vehicle based on the running environment of said given vehicle or the operations performed by the driver, and a system controller configured for controlling said running controller and said deceleration controller according to information from said transitional state detector. The system controller is configured such that when said transitional state detector detects that the transitional state of said given vehicle is a prescribed transitional state, said running controller is controlled such that said constant headway distance control is released even when constant headway distance control is being performed by said running controller, and said deceleration controller is controlled such that said deceleration support control can be performed.

According to another embodiment of the present invention, a headway distance maintenance supporting system may include a running controller for performing constant headway distance control for following a preceding vehicle when a preceding vehicle is present, a deceleration controller for performing deceleration support control that supports deceleration of said given vehicle corresponding to a headway distance from said preceding vehicle, a running environment detector for detecting a running environment of said given vehicle, an operation detector for detecting operations performed by the driver for adapting to the running environment of said given vehicle, and system controller configured to control said running controller and said deceleration controller according to information from said running environment detector or operation detector. The system controller is configured to judge whether an acceleration control performed to follow a preceding vehicle is inappropriate based on the running environment of said given vehicle or the operations performed by the driver and configured such that when it is judged that acceleration control is inappropriate, said running controller is controlled such that said constant headway distance control is released even when constant headway distance control is being performed by said running controller, and said deceleration controller is controlled such that said deceleration support control can be performed.

According to another embodiment of the present invention, a headway distance maintenance supporting method for a given vehicle may include performing constant headway distance control for following a preceding vehicle when a preceding vehicle is present, performing deceleration support control that supports deceleration of said given vehicle corresponding to a headway distance from said preceding vehicle, detecting a running environment of said given vehicle, detecting operations performed by the driver for adapting to the running environment of said given vehicle, detecting a transitional state of said given vehicle from plurality of transitional states based on the running environment of said given vehicle or the operations performed by the driver, and controlling such that said constant headway distance control is released even when said constant headway distance control is being performed, and said deceleration support control can be performed when the detected transitional state of said given vehicle is detected to be in a prescribed transitional state.

According to another embodiment of the present invention, a headway distance maintenance supporting method for a given vehicle may include performing constant headway distance control for following a preceding vehicle when a preceding vehicle is present, performing deceleration support control that supports deceleration of said given vehicle corresponding to a headway distance from said preceding vehicle, detecting a running environment of said given vehicle, detecting operations performed by the driver for adapting to the running environment of said given vehicle, judging whether an acceleration control performed to follow a preceding vehicle is inappropriate based on the running environment of said given vehicle or the detected operations, and controlling such that said constant headway distance control is released even when said constant headway distance control is being performed, and said deceleration support control can be performed when the acceleration control for performing acceleration to follow preceding vehicle is judged to be inappropriate.

According to another embodiment of the present invention, a computer readable storage medium, having stored data for headway distance maintenance supporting methods for a given vehicle, wherein the computer readable storage medium stores a program for providing instructions for performing constant headway distance control for following a preceding vehicle when a preceding vehicle is present, instructions for performing deceleration support control that supports deceleration of said given vehicle corresponding to a headway distance from said preceding vehicle, instructions for detecting a running environment of said given vehicle, instructions for detecting operations performed by the driver for adapting to the running environment of said given vehicle, instructions for detecting a transitional state of said given vehicle from plurality of transitional states based on the running environment of said given vehicle or the operations performed by the driver, and instructions for controlling such that said constant headway distance control is released even when said constant headway distance control is being performed, and said deceleration support control can be performed when the detected transitional state of said given vehicle is detected to be in a prescribed transitional state.

According to another embodiment of the present invention, a computer readable storage medium, having stored data for headway distance maintenance supporting methods for a given vehicle, wherein the computer readable storage medium stores a program for providing instructions for performing constant headway distance control for following a preceding vehicle when a preceding vehicle is present, instructions for performing deceleration support control that supports deceleration of said given vehicle corresponding to a headway distance from said preceding vehicle, instructions for detecting a running environment of said given vehicle, instructions for detecting operations performed by the driver for adapting to the running environment of said given vehicle, instructions for judging whether an acceleration control performed to follow a preceding vehicle is inappropriate based on the running environment of said given vehicle or the detected operations, and instructions for controlling such that said constant headway distance control is released even when said constant headway distance control is being performed, and said deceleration support control can be performed when the acceleration control for performing acceleration to follow preceding vehicle is judged to be inappropriate.

It is to be understood that both the foregoing general description and the following detailed descriptions are exemplary and explanatory only, and are not restrictive of the invention as claimed.

BRIEF DESCRIPTION OF DRAWINGS

These and other features, aspect, and advantages of the present invention will become apparent from the following description, appealed claims, and the accompanying exemplary embodiments shown in the drawings, which are briefly described below.

DETAILED DESCRIPTION

When plural systems that perform the deceleration control are installed in a vehicle, how to perform switching of plural deceleration controls having different control contents becomes problematic.

Figure 1:
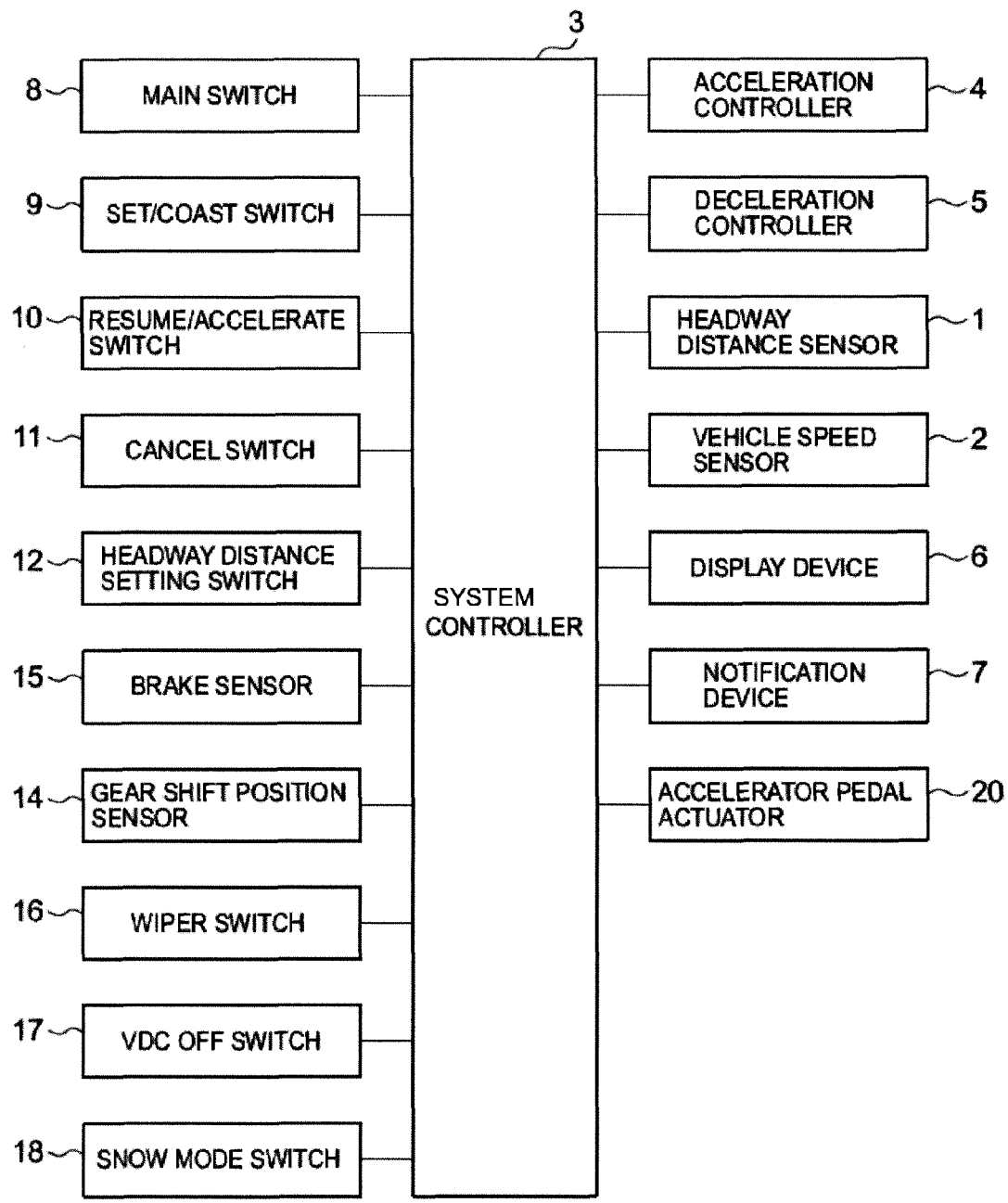
FIG. 1 is a block diagram showing the headway distance maintenance supporting system according to an embodiment of the present invention.
Figure 2:
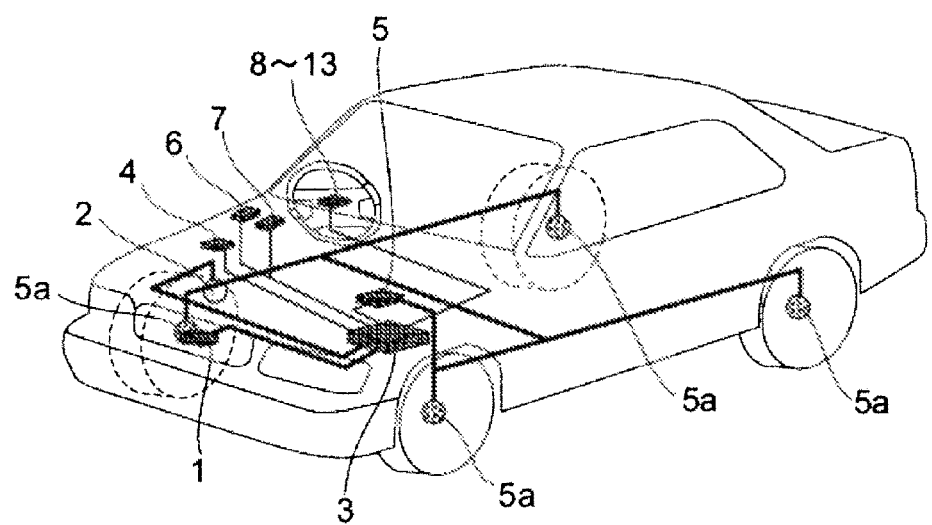
FIG. 2 is a diagram schematically showing a vehicle in which the headway distance maintenance supporting device is installed.

In the following, an embodiment of the headway distance maintenance supporting system and headway distance maintenance supporting method which solves the aforementioned problems will be explained with reference to FIGS. 1-11. FIG. 1 is a block diagram illustrating a headway distance maintenance supporting system according to one embodiment of the present invention. FIG. 2 is a diagram illustrating a vehicle carrying the headway distance maintenance supporting system shown in FIG. 1. Here, the headway distance maintenance supporting system comprises headway distance sensor 1, vehicle speed sensor 2, system controller 3, acceleration controller 4, deceleration controller 5, display device 6, notification device 7, and accelerator pedal actuator 20. In addition, the following parts manipulated by the driver are respectively connected to system controller 3: main switch 8, set/coast switch 9, resume/accelerate switch 10, cancel switch 11, and headway distance setting switch 12. Also, the following parts are respectively connected to system controller 3: gear shift position sensor 14, brake sensor 15, wiper switch 16, VDC OFF switch 17, and snow mode switch 18.

Headway distance sensor 1 may include a radar device that by emitting a laser beam ahead of the vehicle detects a preceding vehicle, and at the same time detects the headway distance from the detected preceding vehicle. It may also be configured such that the relative speed between the given vehicle and the preceding vehicle is determined from the detected headway distance. Vehicle speed sensor 2 detects the speed of the given vehicle. Here, assuming the vehicle speed of the given vehicle to be V, vehicle speed sensor 2 is configured to allow detection of wheel speeds Vw1, Vw2, Vw3, and Vw4 of the various wheels.

System controller 3 comprises CPU, ROM, RAM, and other CPU peripherals, and it performs overall control of the headway distance maintenance supporting system based on signals input from the various sensors and switches. More specifically, system controller 3 performs control to follow the preceding vehicle for automatic running of the given vehicle while following the preceding vehicle based on the headway distance detected with headway distance sensor 1 and the speed of the given vehicle detected with vehicle speed sensor 2. That is, system controller 3 works as follows: when a preceding vehicle is detected, system controller 3 controls acceleration controller 4 and deceleration controller 5 such that the headway distance between the given vehicle and the preceding vehicle is kept almost constant, with a preset vehicle speed as the upper limit. This control will be referred to as constant headway distance control. On the other hand, when no preceding vehicle is detected, system controller 3 controls acceleration controller 4 and deceleration controller 5 such that a preset vehicle speed is maintained. This control will be referred to as constant speed control below. In this way, performance of the control for following a preceding vehicle involves constant headway distance control or constant speed control depending on the presence/absence of detection of preceding vehicle.

In addition, when the headway distance detected with headway distance sensor 1 becomes less than a preset threshold, system controller 3 controls deceleration controller 5 to perform headway distance control wherein the given vehicle decelerates (deceleration support control) so that the headway distance from the preceding vehicle is guaranteed.

Acceleration controller 4 has, for example, a throttle actuator, and based on instructions from system controller 3 it controls acceleration/deceleration of the given vehicle by controlling opening/closing of the throttle valve, not shown in the figure. Deceleration controller 5 has, for example, a brake actuator, and based on instructions from system controller 3 it controls the braking force of braking device 5a such as a hydraulic brake provided at each wheel. Hydraulic brakes 5a operate under control of deceleration controller 5, and at the same time, they operate when the driver depresses the brake pedal (not shown in the figure).

Display device 6 comprises, for example, a liquid crystal monitor, and it displays the status of the preceding vehicle following control and deceleration support control performed by the headway distance maintenance supporting system according to an instruction from system controller 3. Notification device 7 comprises, for example, a notification buzzer, and according to instructions from system controller 3 it notifies the driver of the status of the preceding vehicle following control and deceleration support control. As will be explained later, accelerator pedal actuator 20 is an actuator that applies a reaction force to the accelerator pedal (not shown in the figure) and based on instructions from system controller 3, it applies a force (reaction force) in the direction opposite to the force of the driver's foot in depressing the accelerator pedal.

Headway distance sensor 1, vehicle speed sensor 2, system controller 3, acceleration controller 4, deceleration controller 5, display device 6, notification device 7, main switch 8, set/coast switch 9, resume/accelerate switch 10, cancel switch 11, headway distance setting switch 12, brake sensor 15, wiper switch 16, VDC OFF switch 17, and snow mode switch 18 form the system for following a preceding vehicle (hereinafter to be referred to as the following control system). On the other hand, headway distance sensor 1, vehicle speed sensor 2, system controller 3, deceleration controller 5, display device 6, notification device 7, main switch 8, brake sensor 15, VDC OFF switch 17, snow mode switch 18, and accelerator pedal actuator 20 form a system for deceleration support control (hereinafter to be referred to as the deceleration support control system).

Main switch 8, set/coast switch 9, resume/accelerate switch 10, cancel switch 11 and headway distance setting switch 12 are respectively positioned to allow easy operation by the driver sitting behind the steering wheel. Here, main switch 8 is a switch for turning ON/OFF of the following control system and deceleration support control system. Set/coast switch 9 is a switch for starting constant speed control from the standby operating state to be explained later. When the constant speed control is performed, the preset vehicle speed is reduced by operating set/coast switch 9.

Resume/accelerate switch 10 is a switch for starting the constant speed control from the standby operating state while the most recent setting is maintained as is. When constant speed control is being performed, the preset vehicle speed can be increased by the operation of resume/accelerate switch 10.

Cancel switch 11 is a switch for transition to the standby operating state (transition) in the case of constant speed control, and for transition to deceleration support control in the case of constant headway distance control. Headway distance setting switch 12 is a switch for changing the headway distance from the preceding vehicle (target headway distance).

Gear shift position sensor 14 detects the gear shift position of the transmission. Brake sensor 15 detects that the brake pedal, not shown in the figure, has been depressed by the driver. Wiper switch 16 is a switch for operating the wiper.

VDC OFF switch 17 is a switch for canceling VDC (Vehicle Dynamics Control) control. Here, VDC control refers to a control for stabilizing the behavior of the vehicle. Snow mode switch 18 is a switch for changing the settings of the vehicle, such as the relationship between the throttle opening and the engine torque, to match the state of the road surface, as for a snowy road, slippery road, etc.

In the following, the operation of the headway distance maintenance supporting system will be explained.

As explained above, the headway distance maintenance supporting system performs preceding vehicle following control by the following control system and deceleration support control by the deceleration support control system. In the following control system, a target vehicle speed of the given vehicle is computed for following a preceding vehicle based on the headway distance from the detected preceding vehicle and the speed of the given vehicle, and acceleration and deceleration control are performed to realize this target vehicle speed. When the brake pedal is depressed, the following control system releases its control.

The deceleration support control system is for performing deceleration control to guarantee the headway distance from the preceding vehicle in a situation in which the vehicle is approaching the preceding vehicle, and although control is temporarily paused when the brake pedal is depressed, control is not released. In the following, the deceleration support control performed by the deceleration support control system will be explained in more detail. In the deceleration support control to be explained below, as was explained above, when the brake pedal is depressed or another prescribed operation is performed, or when it is judged that the vehicle's running state has become a prescribed state, deceleration support control is temporarily paused (interrupted). Then, when the prescribed operation is no longer performed and it is judged that the running state of the vehicle is not in the prescribed state, the paused deceleration support control is started again.

Figure 3:
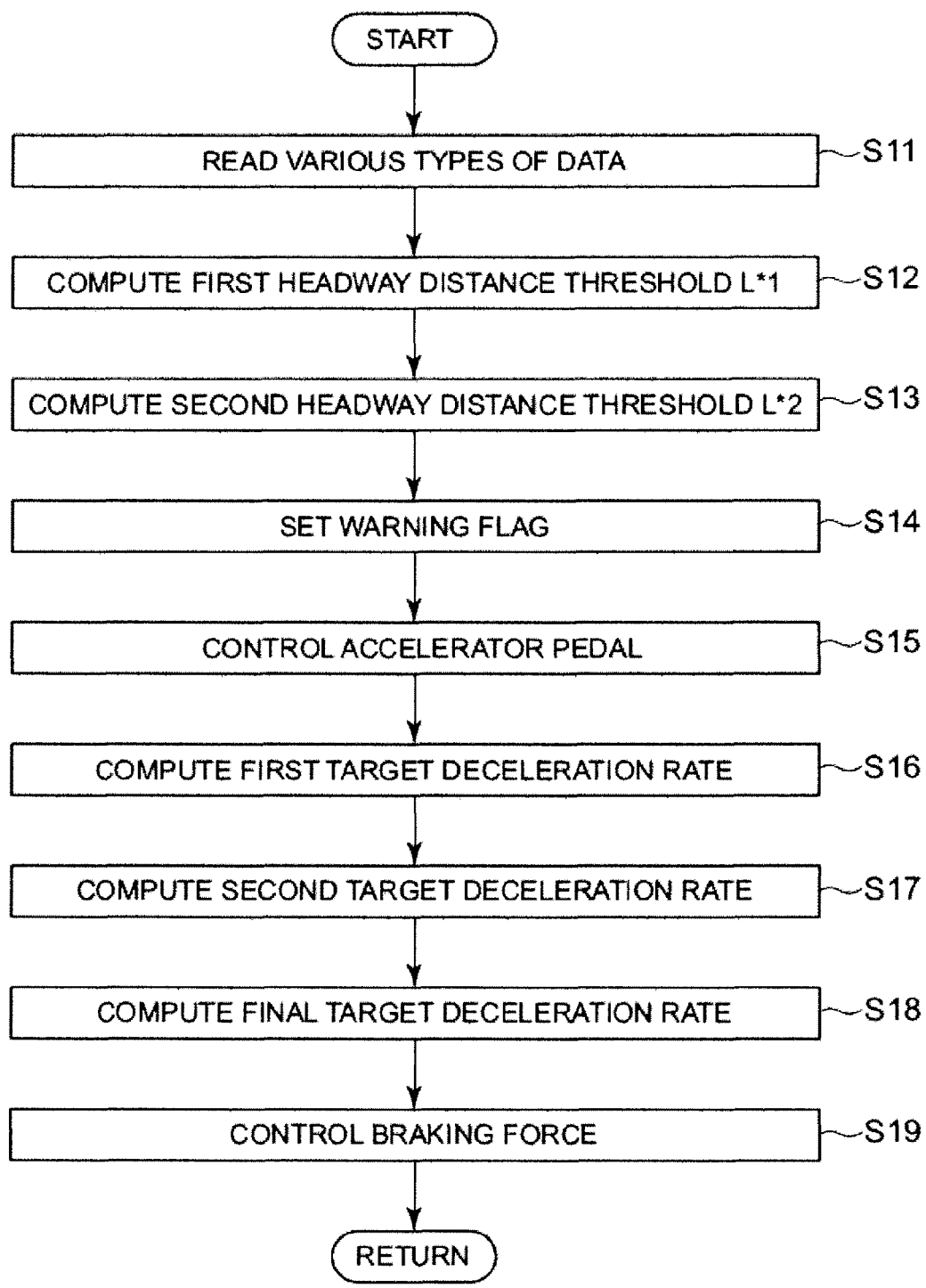
FIG. 3 is a flow chart illustrating a process of deceleration support control performed by the deceleration support control system.
Figure 4:
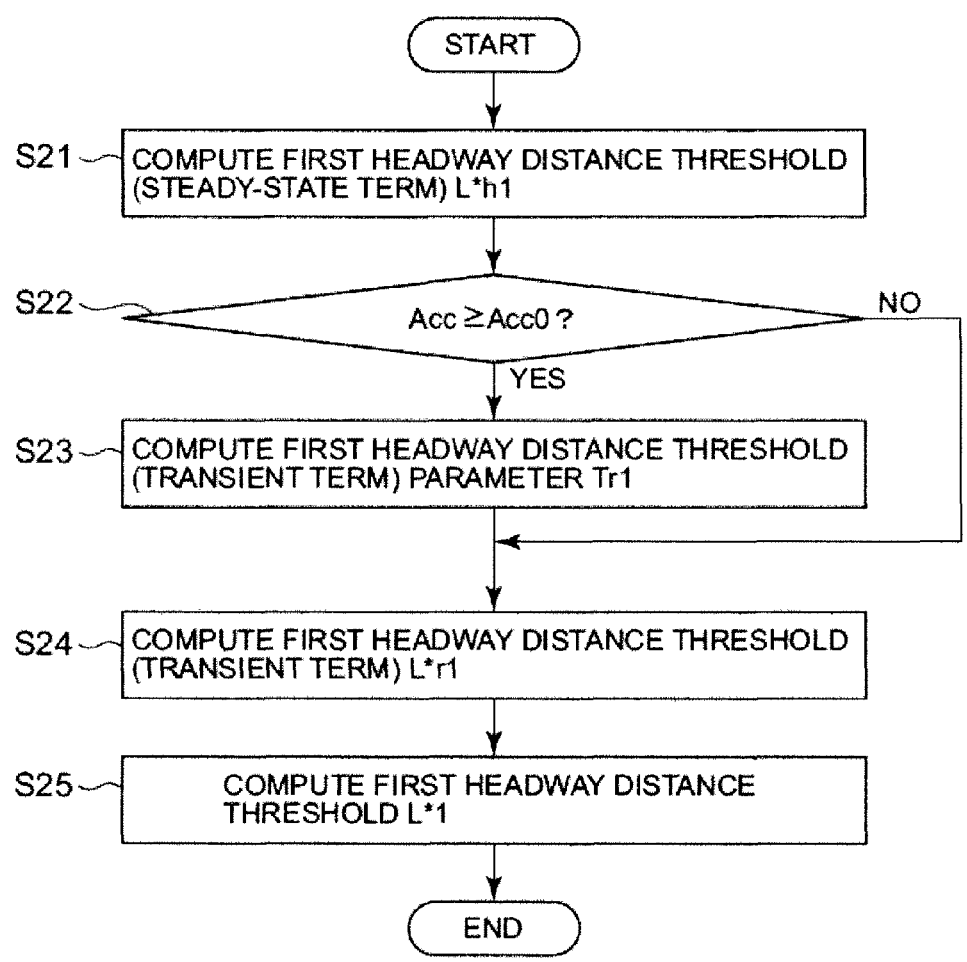
FIG. 4 is a flow chart illustrating a method of computing first headway distance threshold L*1.

FIG. 3 is a flow chart illustrating the deceleration support control performed by the deceleration support control system. As will be explained later, when main switch 8 is turned ON, system controller 3 starts the processing of step S11. In step S11, throttle opening Acc detected by the throttle opening sensor (not shown in the figure) with which the deceleration support control system is equipped, the vehicle speed of the given vehicle detected by vehicle speed sensor 2, headway distance L to the preceding vehicle detected by headway distance sensor 1 (such as laser radar), and relative speed Vr are read, and the process proceeds to step S12. Also, as explained above, vehicle speed sensor 2 is configured such that it is possible to detect wheel speeds Vw1, Vw2, Vw3, and Vw4 of the various wheels as the vehicle speed of the given vehicle.

In step S12, first headway distance threshold L*1 is computed. In the following, the method for computing the first headway distance threshold L*1 will be explained in more detail with reference to the flow chart shown in FIG. 4. In step S21 of the flow chart shown in FIG. 4, headway distance threshold L*h1 is computed by the following equation (1). As will be explained later, first headway distance threshold L*1 is computed from the sum of the steady-state term of the first headway distance threshold and the transient term, while headway distance threshold L*h1 determined using equation (1) represents the value of the steady-state term.

$$L^*h1 = Va \times Th \tag{1}$$

Here, Va represents the vehicle speed of the preceding vehicle computed based on given vehicle speed V and relative speed Vr; and Th represents a prescribed headway time. Also, given vehicle speed V is computed by determining the mean value of wheel speeds Vw1, Vw2 of the front wheels detected by vehicle speed sensor 2.

In step S22 after step S21, judgment is made on whether throttle opening Acc detected by the throttle opening sensor is larger than prescribed throttle opening threshold Acc0. If it is judged that throttle opening Acc is larger than throttle opening threshold Acc0, it is judged that the driver is depressing the accelerator pedal, accelerator operation flag Facc is turned ON, and the process proceeds to step S23. On the other hand, when it is judged that throttle opening Acc is smaller than throttle opening threshold Acc0, it is judged that the driver is not depressing the accelerator pedal, accelerator operation flag Facc is turned OFF, and the process proceeds to step S24.

In step S23, equation (2) below is used to compute parameter Tr1 for computing transient term L*r1 as the first headway distance threshold.

$$Tr1 = (L - L^*h1)/Vr \tag{2}$$

In equation (2), assuming that the current relative speed Vr is maintained, parameter Tr1 represents the time until headway distance L reaches first headway distance threshold L*h1. After parameter Tr1 is computed, the process proceeds to step S24.

As can be seen from the processing performed in steps S22 and S23, parameter Tr1 for computing transient term L*r1 as the first headway distance threshold is computed (refreshed) only when accelerator operation flag Facc is turned ON. Consequently, when the accelerator pedal is operated, parameter Tr1 is set corresponding to actual headway distance L, and when the accelerator pedal is not operated, the value when the accelerator pedal is not operated is retained.

In step S24, equation (3) is used to compute transient term L*r1 of the headway distance threshold, and the process proceeds to step S25.

$$L^*r1 = Tr1 \times Vr \tag{3}$$

In step S25, first headway distance threshold L*1 is computed by adding steady-state term L*h1 of the first headway distance threshold computed in step S21 and transient term L*r1 of the headway distance threshold computed in step S23 (see equation (4)).

$$L^*1 = L^*h1 + L^*r1 \tag{4}$$

Here, when accelerator pedal operation is performed (when accelerator operation flag Facc is turned ON), equations (1), (3), (4) yield L*1=L. After first headway distance threshold L*1 is computed, the process proceeds to step S13 in the flow chart shown in FIG. 3.

In step S13, second headway distance threshold L*2 is computed. Details of the method of computing second headway distance threshold L*2 will be explained with reference to the flow chart shown in FIG. 5.

Figure 5:
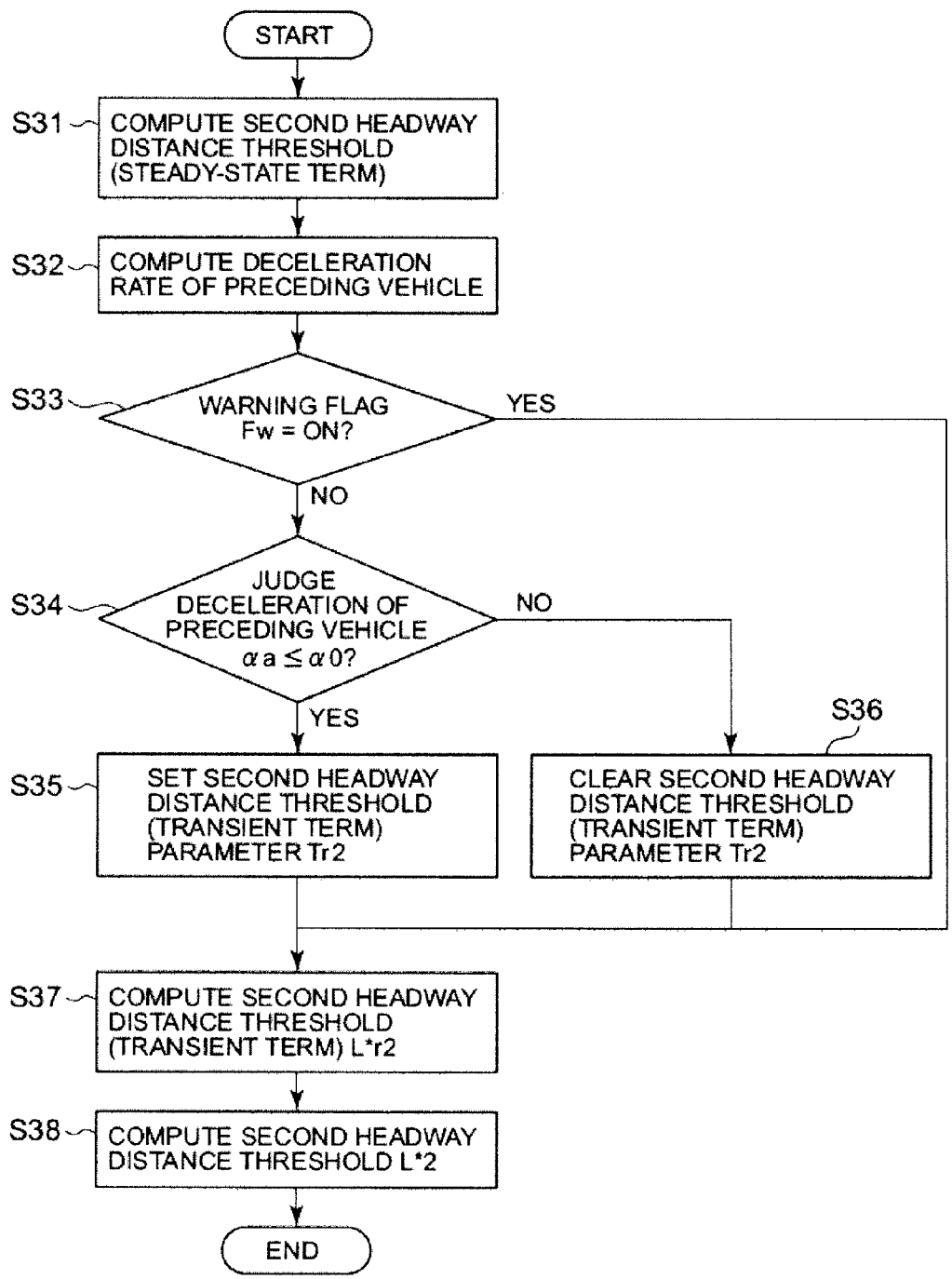
FIG. 5 is a flow chart illustrating a method of computing second headway distance threshold L*2.

In step S31 of the flow chart shown in FIG. 5, headway distance threshold L*h2 is computed based on given vehicle speed V and relative speed Vr. As will be explained later, second headway distance threshold L*2 is computed as the sum of the steady-state term of the second headway distance threshold and the transient term, while headway distance threshold L*h2 is the value of a steady-state term. Here, the function for computing headway distance threshold L*h2 is prepared beforehand based on given vehicle speed V and relative speed Vr, and this threshold is computed by substituting given vehicle speed V and relative speed Vr into the function. After computation of the second headway distance threshold L*h2, the process proceeds to step S32.

In step S32, the following equation (5) is used to compute acceleration/deceleration αa of the preceding vehicle.

$$\alpha a = d(Va)/dt \tag{5}$$

After computation of acceleration/deceleration αa of the preceding vehicle, the process proceeds to step S33. In step S33, judgment is made on whether warning flag Fw set in step S14 to be explained later (see FIG. 3) is ON or OFF. Because the processing of steps S11-S19 is performed repeatedly, a judgment is made here based on the state of warning flag Fw set in the last processing cycle. When it is judged that warning flag Fw is set ON, the process proceeds to step S37. On the other hand, when it is judged that warning flag Fw is set OFF, the process proceeds to step S34.

In step S34, judgment is made on whether acceleration/deceleration αa of the preceding vehicle computed in step S32 is lower than prescribed acceleration/deceleration α0. Here, the prescribed acceleration/deceleration α0 is the threshold for judging whether the preceding vehicle is decelerating. For both αa and α0, the value is positive for acceleration and negative for deceleration. When it is judged that acceleration/deceleration αa of the preceding vehicle is lower than the prescribed acceleration/deceleration α0, it is judged that the preceding vehicle is decelerating. As a result, after preceding vehicle deceleration judgment flag Fdec_a is set ON, the process proceeds to step S35. On the other hand, when it is judged that acceleration/deceleration αa of the preceding vehicle is higher than the prescribed acceleration/deceleration α0, it is judged that the preceding vehicle is not decelerating. After preceding vehicle deceleration judgment flag Fdec_a is set OFF, the process proceeds to step S36.

In step S35, parameter Tr2 for computing transient term L*r2 of the second headway distance threshold is computed by the following equation (6).

$$Tr2 = (L - L^*h2)/Vr \tag{6}$$

In equation (6), parameter Tr2 represents the time obtained by using relative speed Vr to divide the value (L−L*h2) corresponding to the margin distance of actual headway distance L with respect to steady-state term L*h2 of the second headway distance threshold at the time that deceleration of the preceding vehicle starts. After computation of parameter Tr2, the process proceeds to step S37.

On the other hand, in step S36, which is reached after a judgment that the preceding vehicle is not decelerating, the value of parameter Tr2 for computing transient term L*r2 of the second headway distance threshold is set at 0, and the process then proceeds to step S37.

In step S37, transient term L*r2 of the second headway distance threshold is computed by following equation (7), and the process then proceeds to step S38.

$$L^*r2 = Tr2 \times Vr \tag{7}$$

In step S38, second headway distance threshold L*2 is computed by adding steady-state term L*h2 of the second headway distance threshold and the transient term L*r2 (see equation (8)).

$$L^*2 = L^*h2 + L^*r2 \tag{8}$$

In step S38, after second headway distance threshold L*2 is computed, the process proceeds to step S14 of the flow chart shown in FIG. 3. In step S14, warning flag Fw is set. Consequently, first of all, the following equation (9) is used to compute deviation ΔL2 between second headway distance threshold L*2 computed in step S13 and headway distance L from the preceding vehicle detected by headway distance sensor 1.

$$\Delta L2 = L*2 - L \qquad (9)$$

Then, if deviation ΔL2 computed by means of equation (9) is greater than 0, warning flag Fw is set ON since headway distance L to the preceding vehicle is less than second headway distance threshold L*2. On the other hand, if deviation ΔL2 is less than 0, warning flag Fw is set OFF. After warning flag Fw is set, the process proceeds to step S15.

In step S15, control is performed to apply a reaction force to the accelerator pedal (not shown in the figure) based on deviation ΔL2 of the headway distance. In the following, the processing performed for applying a reaction force to the accelerator pedal will be explained in more detail with reference to the flow chart shown in FIG. 6.

Figure 6:
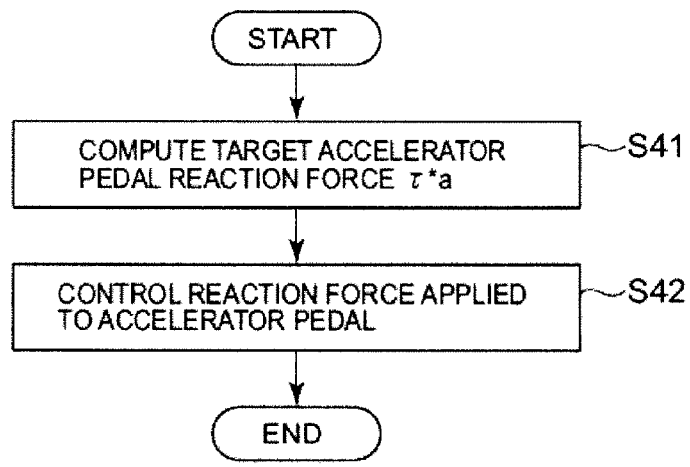
FIG. 6 is a flow chart illustrating a process of control for applying a reaction force to the accelerator pedal.

In step S41 of the flow chart shown in FIG. 6, the following equation (10) is used to compute target accelerator pedal reaction force τ*a.

$$\tau*a = Kp \times \Delta L2 \qquad (10)$$

In equation (10), Kp (Kp>0) represents a prescribed gain for computing the target accelerator pedal reaction force from headway distance deviation ΔL.

In step S42 following step S41, the instruction to apply a reaction force to the accelerator pedal corresponding to the target accelerator pedal reaction force τ*a computed in step S41 is output to accelerator pedal actuator 20. After receiving this instruction, accelerator pedal actuator 20 applies the reaction force corresponding to target accelerator pedal reaction force τ*a to accelerator pedal 81. As can be seen from equation (10), a reaction force is applied to the accelerator pedal when ΔL2 is positive, that is, when headway distance L is less than headway distance threshold L*2. After the processing of step S42 is complete, the process proceeds to step S16 of the flow chart shown in FIG. 3.

In step S16, based on first headway distance threshold L*1 computed in step S12 and headway distance L to the preceding vehicle detected by headway distance sensor 1, first target deceleration rate α*1 is computed using the following equation (11).

$$\alpha*1 = Kv \times Kr1 \times (L*1 - L) \qquad (11)$$

Here, Kr1 represents the gain for computing the first target deceleration rate force generated for the vehicle. Also, gain Kv represents the gain for converting the target deceleration rate force to the target deceleration rate, and it is preset based on the various parameters of the vehicle. Here, the value for first target deceleration rate α*1 is positive for the acceleration direction and negative for the deceleration direction.

As was explained above, when the accelerator pedal operation is performed (when accelerator operation flag Facc is ON), L*1=L. Consequently, first target deceleration rate α*1 becomes 0. Also, when first target deceleration rate α*1 computed using equation (11) is smaller than prescribed first lower threshold Δα*1, the value of first target deceleration rate α*1 is set at Δα*1. After computation of first target deceleration rate α*1, the process proceeds to step S17.

In step S17, based on second headway distance threshold L*2 computed in step S13 and headway distance L to the preceding vehicle detected with headway distance sensor 1, second target deceleration rate α*2 is computed using the following equation (12).

$$\alpha*2 = Kv \times Kr2 \times (L*2 - L) \qquad (12)$$

Here, Kr2 represents the gain for computing the second target deceleration rate force, and the value of second target deceleration rate α*2 is set at 0 when accelerator pedal operation is performed. Also, the value for second target deceleration rate α*2 is positive for the acceleration direction and negative for the deceleration direction.

When second target deceleration rate α*2 computed using equation (12) is smaller than prescribed second lower threshold Δα*2(Δα*2<Δα*1), the value of the second target deceleration rate α*2 is set at Δα*2. After computation of second target deceleration rate α*2, the process proceeds to step S18.

In step S18, final target deceleration rate α* generated for the vehicle is determined. Here, first target deceleration rate α*1 computed in step S16 and second target deceleration rate α*2 computed in step S17 are compared with each other, and the deceleration with the larger absolute value, that is, the target deceleration rate representing a larger deceleration, is taken as the final target deceleration rate α*. Here, too, the value for final target deceleration rate α* is positive for acceleration and negative for deceleration.

In step S19 following step S18, braking control is performed based on final target deceleration rate α*. First of all, as shown in the following Equation (13), deceleration α*eng generated by engine braking is subtracted from final target deceleration rate α* determined in step S18 to compute target deceleration rate α*brk generated by the brake.

$$\alpha*brk = \alpha* - \alpha*eng \qquad (13)$$

Here, the values for α*, and α*brk, α*eng are positive for the acceleration direction and negative for the deceleration direction. Also, when accelerator pedal operation is performed (when accelerator operation flag Facc is ON), α*=α*eng=0, so that α*brk=0.

Then, based on the computed a*brk, the following equation (14) is used to compute target brake hydraulic pressure P*.

$$P* = -(Kb \times \alpha*brk) \qquad (14)$$

Here, Kb represents the gain for converting the target deceleration rate to the target brake hydraulic pressure, and it is preset based on the various parameters of the vehicle. Also, when accelerator pedal operation is performed (when accelerator operation flag Facc is ON), α*brk=0, so that one has P*=0.

Then an instruction for generating the brake hydraulic pressure based on the computed target brake hydraulic pressure P* is output to deceleration controller 5. Upon receiving this instruction, deceleration controller 5 generates a brake hydraulic pressure based on target brake hydraulic pressure P*, and it is supplied to the wheel cylinders (not shown in the figure) of hydraulic brakes 5a respectively provided at the various wheels. As a result, when headway distance L is less than first headway distance threshold L*1 and is less than second headway distance threshold L*2, control to decelerate the vehicle is performed if the driver does not depress the accelerator pedal. On the other hand, if the driver depresses the accelerator pedal, deceleration control is not performed because target brake hydraulic pressure P*=0.

When the processing of step S19 is complete, the process returns to step S11. Then, the processing of steps S11-S19 is repeated.

In this way, the following control system and the deceleration support control system respectively perform different control. However, they share the common function of deceleration corresponding to the headway distance from the preceding vehicle. For the headway distance maintenance supporting system of this embodiment, the control state transitions as follows in each system. That is, for the headway distance maintenance supporting system of this embodiment, the transition state of the vehicle is detected, and the control state is changed in the following control system and the deceleration support control system according to the detected vehicle transition state. In the following, the operation will be explained in more detail.

Figure 7:
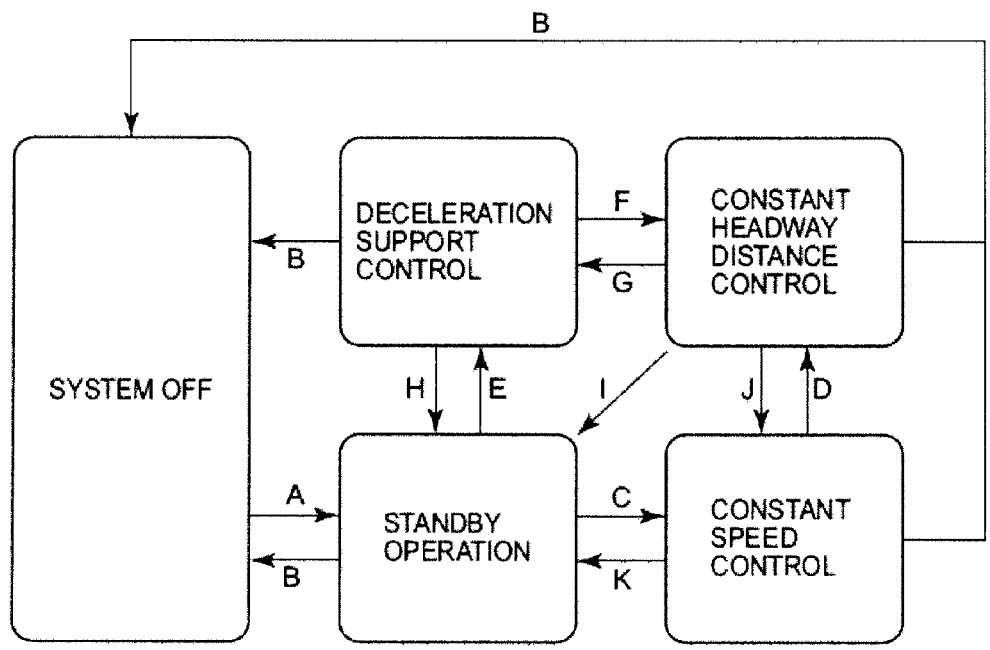
FIG. 7 is a diagram illustrating transition of the control state in the following control system and the deceleration support control system.

FIG. 7 is a diagram illustrating transition of the control state in the following control system and the deceleration support control system. For example, when the ignition switch of the vehicle is turned to the accessory ON (ACC ON) state, power to the headway distance maintenance supporting system is turned ON, and the system is OFF. In the system OFF state, the preceding vehicle following control and deceleration support control are not performed.

(1) Transition from System OFF State to Standby Operating State (Transition)

When main switch 8 is turned ON when the system is in the OFF state, system controller 3 controls the various parts to transition to the standby operating state (state transition A). In the standby operating state, the preceding vehicle following control and deceleration support control are not performed. However, system controller 3 monitors the various parts of the vehicle and the headway distance maintenance supporting system. If it is judged that the condition to be explained later is met, the control state transitions from the standby operating state to another control state based on the met condition.

(2) Transition from a State Other than System OFF State to System OFF State

When any of the following conditions is met while in the standby operating state, constant speed control state, constant headway distance control state, or deceleration support control state (that is, in any state other than the system OFF state), system controller 3 controls the various parts so that transition is made from each control state to the system OFF state (state transition B).

(2a) Main switch 8 is turned OFF
(2b) Detection of malfunctions in the following control system or deceleration support control system (3) Transition from Standby Operating State to Constant Speed Control State When all of the conditions listed below are met while in the standby operating state, system controller 3 controls the various parts such that the state transitions from the standby operating state to the constant speed control state (state transition C). The aforementioned constant speed control is performed in the constant speed control state.

(3a) Set/coast switch 9 or resume/accelerate switch 10 is ON
(3b) The given vehicle speed V is over about 30 km/h
(3c) Brake sensor 15 detects no braking operation performed by the driver
(3d) Wiper switch 16 is not ON
(3e) The gear shift position of the transmission detected with gear shift position sensor 14 is not in park (P), reverse (R), or neutral (N)

(4) Transition from Constant Speed Control State to Constant Headway Distance Control State When headway distance sensor 1 detects a preceding vehicle while in the constant speed control state, system controller 3 controls the various parts so that a transition is made from the constant speed control state to the constant headway distance state (state transition D). In the constant headway distance control state, the constant headway distance control is performed.

(5) Transition from Standby Operating State to Deceleration Support Control State When all of the following listed conditions are met while in the standby operating state, system controller 3 controls the various parts so that the standby operating state transitions to the deceleration support control state (state transition E). The deceleration support control is performed in the deceleration support control system.

(5a) Headway distance sensor 1 detects a preceding vehicle
(5b) Brake sensor 15 detects no braking operation performed by the driver
(5c) VDC OFF switch 17 is not turned ON (the VDC function is not cancelled)
(5d) The road surface is not slippery Here, with regard to the condition "(5d) The road surface is not slippery", it is judged that the road surface is not slippery when snow mode switch 18 is not ON, and it is judged that that the vehicle is not slipping based on detection signals from vehicle speed sensor 2, etc.

(6) Transition from Deceleration Support Control State to Constant Headway Distance Control State When all of the following listed conditions are met while in the deceleration support control state, system controller 3 controls the various parts so that the deceleration support control state transitions to the constant headway distance control state (state transition F). The constant headway distance control is performed in the constant headway distance control state.

(6a) Set/coast switch 9 or resume/accelerate switch 10 is turned ON
(6b) Brake sensor 15 detects no braking operation performed by the driver
(6c) Wiper switch 16 is not turned ON
(6d) The gear shift position detected with gear shift position sensor 14 is not in park (P), reverse (R), or neutral (N)

(7) Transition from Constant Headway Distance Control State to Deceleration Support Control State When at least one of the following listed conditions is met while in the constant headway distance control state, system controller 3 controls the various parts such that a transition is made from the constant headway distance control state to the deceleration support control state (state transition G).

(7a) Cancel switch 11 is turned ON
(7b) Wiper switch 16 is turned ON
(7c) The gear shift position detected with gear shift position sensor 14 is in park (P), reverse (R), or neutral (N)
(7d) It is judged that at least one wheel rotates idly based on detection signals from vehicle speed sensor 2, etc.

The conditions are those for judging whether it is inappropriate to perform control in conjunction with acceleration to follow the preceding vehicle. For example, when cancel switch 11 is turned ON, it is a case in which cancel switch 11 is manipulated by the driver who intends to cancel constant headway distance control. When wiper switch 16 is turned ON, the state is such that the constant headway distance control is preferably released due to the running environment, such as when the accuracy of detecting the preceding vehicle may be degraded due to headway distance sensor 1 using, for example, a laser radar, when the road surface tends to become slippery due to rain or snow.

If the gear shift position detected with gear shift position sensor 14 is in park (P), reverse (R), or neutral (N), the driver is trying to stop or reverse the given vehicle irrespective of any forward movement of the preceding vehicle, and it is necessary to release constant headway distance control. When it is judged that at least one wheel rotates idly, the environment has caused the behavior of the vehicle to become unstable, and in this running environment it is preferred that constant headway distance control be released.

That is, a judgment of whether there is a transition from the constant headway distance control state to the deceleration support control state is made according to the detected running environment and whether or not an operation is performed by the driver for adapting to the running environment.

(8) Transition from Deceleration Support Control State to Standby Operating State When at least one of the following listed conditions is met while in the deceleration support control state, system controller 3 controls the various parts such that a transition is made from the deceleration support control state to the standby operating state (state transition H). That is, if the following prescribed operation is performed or it is judged that the running state of the vehicle (running environment) has entered a prescribed state, a transition is made from the deceleration support control state to the standby operating state, and the deceleration support control is temporarily paused (interrupted). On the other hand, if the prescribed operation is not performed and it is judged that the running state of the vehicle has not entered the prescribed state, as explained above in "(5) Transition from standby operating state to deceleration support control state", a transition is made from the standby operating state to the deceleration support control state, and the interrupted deceleration support control is restarted.

(8a) Headway distance sensor 1 detects no preceding vehicle
(8b) Brake sensor 15 detects a braking operation performed by the driver
(8c) VDC OFF switch 17 is turned ON (the VDC function is cancelled)
(8d) The road surface is slippery Here, with regard to the condition of "(8d) The road surface is slippery", a judgment is made as to whether snow mode switch 18 is turned ON, or a judgment is made that the road surface is slippery when it is judged that the vehicle is slipping based on detection signals from vehicle speed sensor 2, etc.

The aforementioned condition is the condition for a judgment that a temporary pause (interruption) of deceleration support control is preferred. For example, when headway distance sensor 1 detect no preceding vehicle, headway distance L for use in computing the deceleration support control cannot be computed, and arithmetic and logic operations for deceleration support control cannot be performed, so that it is preferred that deceleration support control be interrupted. When brake sensor 15 detects a braking operation by the driver, the braking operation (deceleration operation) performed by the driver has priority, so that it is preferred that deceleration support control be interrupted.

When VDC OFF switch 17 is ON, that is, when the VDC function is cancelled, it is impossible to suppress unstable vehicle behavior undesired by the driver with the VDC function, so that it is preferred that deceleration support control accompanying the braking operation be interrupted. When the road surface is slippery, it is preferred that deceleration support control accompanying the braking operation be interrupted.

In other words, the conditions (5a)-(5d) explained in the "(5) Transition from standby operating state to deceleration support control state" can be taken as conditions for judging that it is preferred that the interrupted deceleration support control be restored.

(9) Transition from Constant Headway Distance Control State to Standby Operating State When at least one of the following listed conditions is met while in the constant headway distance control state, system controller 3 controls the various parts such that a transition is made from constant headway distance control state to the standby operating state (state transition I).

(9a) Headway distance sensor 1 detects no preceding vehicle while the given vehicle speed V is below about 30 km/h
(9b) Brake sensor 15 detects a braking operation performed by the driver
(9c) VDC OFF switch 17 is turned ON (the VDC function is cancelled)
(9d) The road surface is slippery Here, the condition of "(9d) The road surface is slippery" is identical to the condition of "(8d) The road surface is slippery".

(10) Transition from Constant Headway Distance Control State to Constant Speed Control State When headway distance sensor 1 detects no preceding vehicle while the given vehicle speed V is over about 30 km/h while in the constant headway distance control state, system controller 3 controls the various parts such that a transition is made from the constant headway distance control state to the constant speed control state (state transition J).

(11) Transition from Constant Speed Control State to Standby Operating State

When at least one of the following listed conditions is met while in the constant speed control state, system controller 3 controls the various parts such that a transition is made from the constant speed control state to the standby operating state (state transition K).

(11a) Cancel switch 11 is turned ON
(11b) Given vehicle speed V is below about 30 km/h
(11c) Brake sensor 15 detects a braking operation performed by the driver
(11d) Wiper switch 16 is turned ON
(11e) The gear shift position detected with gear shift position sensor 14 is in park (P), reverse (R), or neutral (N)
(11f) It is judged that at least one wheel rotates idly based on detection signals from vehicle speed sensor 2, etc.

Figure 8:
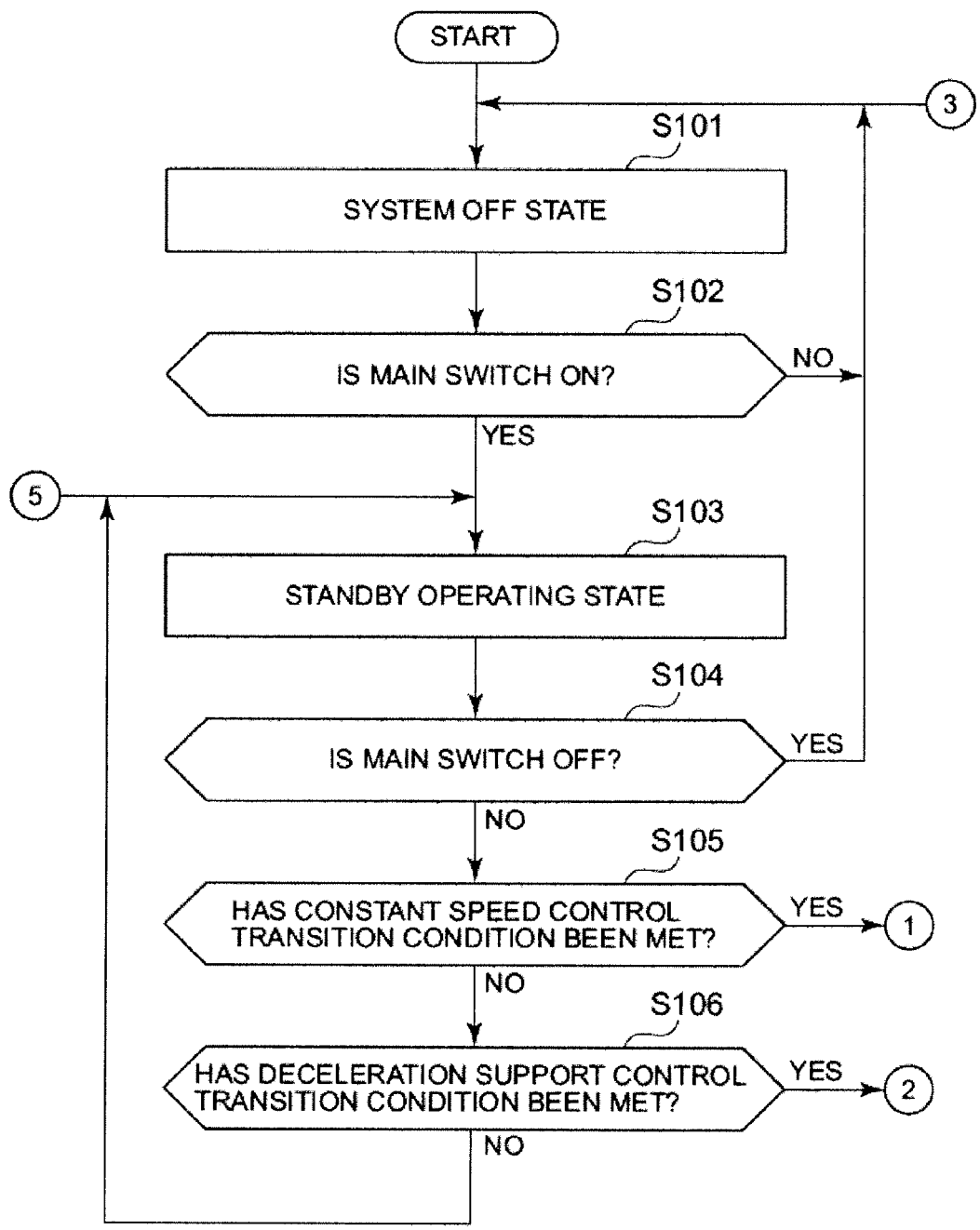
FIG. 8 is a flow chart illustrating operations pertaining to a transition of the control state.

FIGS. 8-11 are flow charts illustrating the operations pertaining to the transitions of the control states. For example, when the ignition switch of the vehicle is turned to the accessory ON (ACC ON) state, power is turned ON for the headway distance maintenance supporting system, and the program for performing the processing shown in FIG. 8 is started and executed by system controller 3. In step S101, control of the various parts is performed to turn the system OFF, and the process then proceeds to step S102. In step S102, judgment is made on whether main switch 8 is ON. If the result of judgment in step S102 is NO, the process returns to step S101.

When the judgment result in step S102 is YES, the process proceeds to step S103, in which the various parts are controlled to transition to the standby operating state. The process then proceeds to step S104. In step S104, judgment is made on whether main switch 8 is turned OFF. If the judgment result in step S104 is YES, the process returns to step S101. If the judgment result in step S104 is NO, the process proceeds to step S105, in which judgment is made on whether the conditions for a transition to constant speed control are met, that is, whether all of conditions (3a)-(3e) described in the "(3) Transition from standby operating state to constant speed control state" are met.

If the judgment result in step S105 is YES, the process proceeds to step S111 shown in FIG. 9 to be explained later. On the other hand, if the judgment result in step S105 is NO, the process proceeds to step S106, in which judgment is made on whether the conditions for a transition to deceleration support control are met, that is, whether all of conditions (5a)-(5e) described in the "(5) Transition from standby operating state to deceleration support control state" are met. If the judgment result in step S106 is YES, the process proceeds to step S121 shown in FIG. 10 to be explained later. On the other hand, if the judgment result in step S106 is NO, the process returns to step S103.

Figure 9:
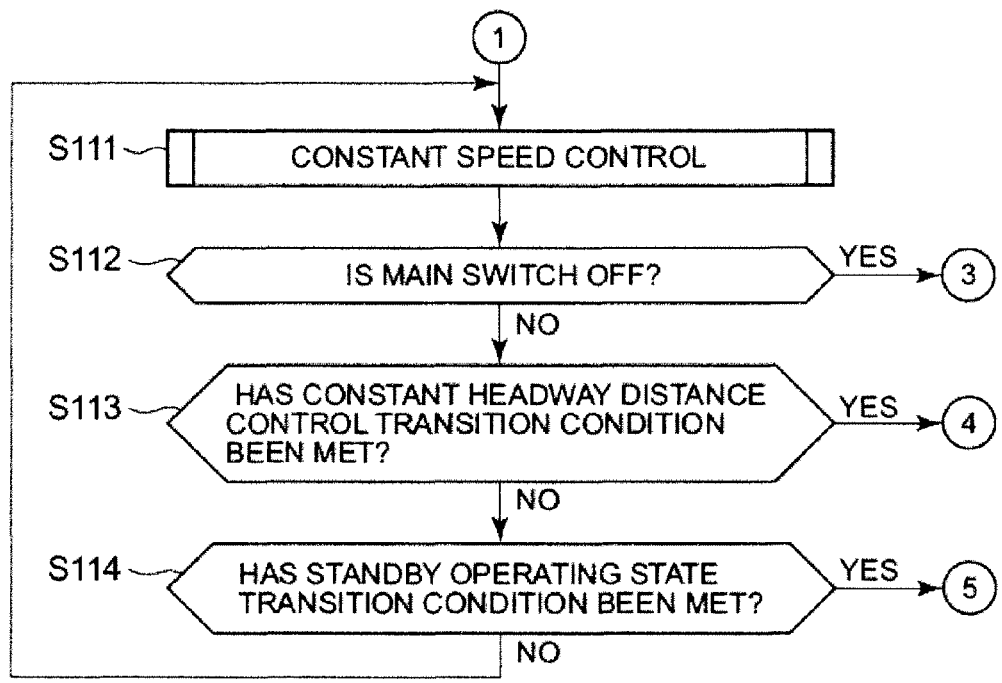
FIG. 9 is a flow chart illustrating operations pertaining to a transition of the control state.

In step S111 shown in FIG. 9, the constant speed control is performed. Because constant speed control is well known, a detailed explanation will not be repeated. After the execution of step S111, the process proceeds to step S112, and judgment is made on whether main switch 8 is turned OFF. If the judgment result in step S112 is YES, the process returns to step S101 shown in FIG. 8. On the other hand, if the judgment result in step S112 is NO, the process proceeds to step S113, and judgment is made on whether the condition for a transition to constant headway distance control is met, that is, whether headway distance sensor 1 has detected a preceding vehicle as described in the "(4) Transition from constant speed control state to constant headway distance control state".

If the judgment result in step S113 is YES, the process proceeds to step S131 shown in FIG. 11 to be explained later. If the judgment result in step S113 is NO, the process proceeds to step S114, and judgment is made on whether a condition for transition to the standby operating state is met, that is, whether at least one of conditions (11a)-(11f) described in the "(11) Transition from constant speed control state to standby operating state" is met. If the judgment result in step S114 is YES, the process returns to step S103 shown in FIG. 8. If the judgment result in step S114 is NO, the process returns to step S111.

Figure 10:
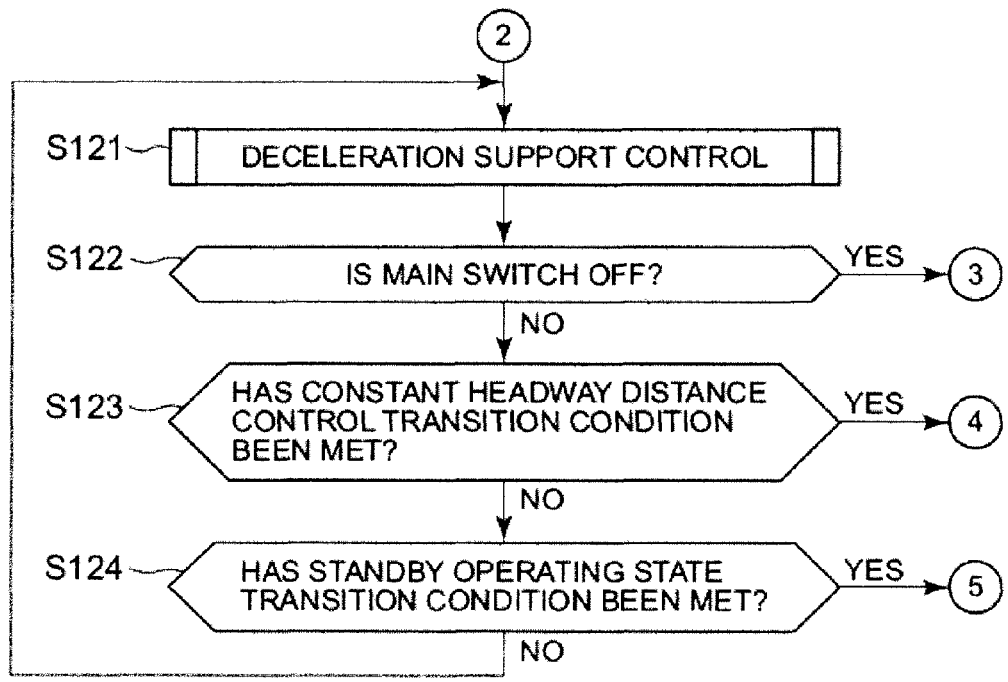
FIG. 10 is a flow chart illustrating operations pertaining to a transition of the control state.

In step S121 shown in FIG. 10, the deceleration support control is performed. The contents of deceleration support control are like those explained with reference to the flow charts shown in FIGS. 3-6. After the execution of step S121, the process proceeds to step S122, and judgment is made on whether main switch 8 is turned OFF. If the judgment result in step S122 is YES, the process returns to step S101 shown in FIG. 8. On the other hand, if the judgment result in step S122 is NO, the process proceeds to step S123, and judgment is made on whether the conditions for a transition to constant headway distance control are met, that is, whether all of conditions (6a)-(6d) described in the "(6) Transition from deceleration support control state to constant headway distance control state" are met.

Figure 11:
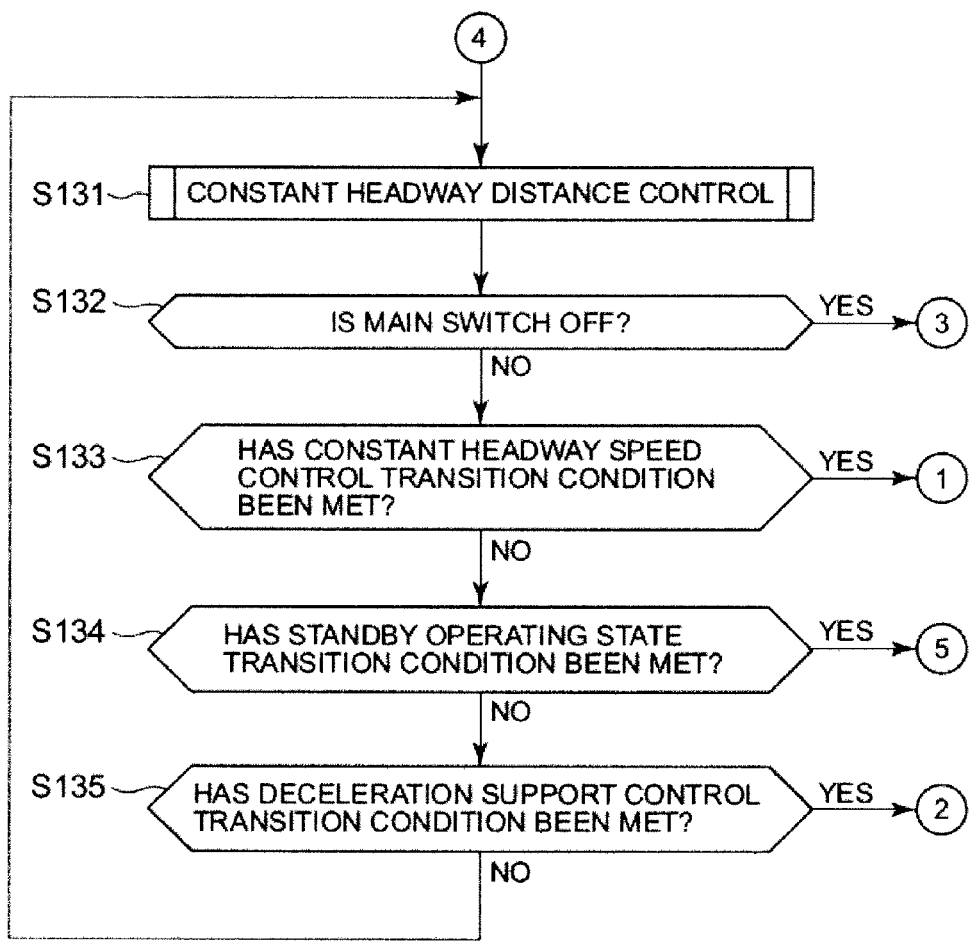
FIG. 11 is a flow chart illustrating operations pertaining to a transition of the control state.

If the judgment result in step S123 is YES, the process proceeds to step S131 shown in FIG. 11. On the other hand, if the judgment result in step S123 is NO, the process proceeds to step S124, and judgment is made on whether a condition for transition to the standby operating state is met, that is, whether at least one of conditions (8a)-(8d) described in the "(8) Transition from deceleration support control state to standby operating state" is met. If the judgment result in step S124 is YES, the process returns to step S103 shown in FIG. 8. On the other hand, if the judgment result in step S124 is NO, the process returns to step S121.

The constant headway distance control state is performed in step S131 shown in FIG. 11. Because constant headway distance control state is well known, it will not be explained in detail here. After the execution of step S131, the process proceeds to step S132, and judgment is made on whether main switch 8 is turned OFF. If the judgment result in step S132 is YES, the process returns to step S101 shown in FIG. 8. On the other hand, if the judgment result in step S132 is NO, the process proceeds to step S133, and judgment is made on whether the condition for a transition to the constant speed control is met, that is, whether headway distance sensor 1 has detected a preceding vehicle while in the state in which given vehicle speed V is over about 30 km/h as described in the explanation of the "(10) Transition from constant headway distance control state to constant speed control state".

If the judgment result in step S133 is YES, the process proceeds to step S111 in FIG. 9. On the other hand, if the judgment result in step S133 is NO, the process proceeds to step S134, and judgment is made on whether a condition for transition to the standby operating state is met, that is, whether at least one of conditions (9a)-(9f) described in the explanation of the "(9) Transition from constant headway distance control state to standby operating state" is met.

If the judgment result in step S134 is YES, the process returns to step S103 in FIG. 8. On the other hand, if the judgment result in step S134 is NO, the process proceeds to step S135, and judgment is made on whether a condition for transition to the deceleration support control state is met, that is, whether at least one of conditions (7a)-(7d) described in the explanation of the "(7) Transition from constant headway distance control state to deceleration support control state" is met. If the judgment result in step S135 is YES, the process proceeds to step S121 shown in FIG. 10. On the other hand, if the judgment result in step S135 is NO, the process returns to step S131.

The aforementioned headway distance maintenance supporting system has the following operation and effects.

(1) When at least one of the conditions (7a)-(7d) is met while in the constant headway distance control state, system controller 3 controls the various parts such that a transition is made from the constant headway distance control state to the deceleration support control state (state transition G in FIG. 7). That is, the constitution is such that constant headway distance control is released while deceleration support control is not released based on the detected running environment of the given vehicle or based on operations performed by the driver for adapting the running environment. Consequently, it is possible to prevent acceleration of the vehicle due to the constant headway distance control, and it is possible to continue the deceleration support control by performing deceleration of the vehicle. As a result, it is possible to expand the running scenario that supports deceleration while preventing vehicle behavior undesired by the driver. Consequently, it is possible to support running of the vehicle appropriately corresponding to the running environment and to operations by the driver.

(2) The constitution is such that while in the deceleration support control state, control of the amount of engine torque generated, control of the braking force of hydraulic brake 5a, and control for applying an operation reaction force to the accelerator pedal are performed. That is, by performing these types of control, deceleration of the vehicle is still supported even when a transition is made from the constant headway distance control state to the deceleration support control state, that is, even when constant headway distance control is released. As a result, the burden on the driver of performing driving operations can be reduced.

(3) As explained above in the "(8) Transition from deceleration support control state to standby operating state", when it is judged that a temporary pause (interruption) of deceleration support control is preferred, deceleration support control is interrupted. As a result, the vehicle behavior undesired by the driver is suppressed, so that the driver does not feel uneasy.

(4) The configuration is such that when all of the conditions (5a)-(5d) described in the "(5) Transition from standby operating state to deceleration support control state" are met, that is, when it is judged that it is preferred for the interrupted deceleration support control to be restored, the interrupted deceleration support control is restored. As a result, it is possible to support deceleration of the vehicle. Consequently, it is possible to reduce the burden of driving operations on the driver.

(5) The configuration is such that even when the constant headway distance control or constant speed control state is released, if set/coast switch 9 or resume/accelerate switch 10 is turned ON, and the other conditions for a transition to the constant headway distance control state or constant speed control state are also met, a transition is made to the constant headway distance control state or constant speed control state. Consequently, it is possible to make transition easily to the constant headway distance control state or the constant speed control state. As a result, it is possible to reduce the burden of driving operations on the driver.

(6) The configurations such that when main switch 8 is turned OFF, there is a transition to the system OFF state. As a result, it is possible to release the control of the following control system and of the deceleration support control system easily. Consequently, it is easy to reflect the intentions of a driver who does not regain control from the following control system and the deceleration support control system at that time.

(7) The configuration is such that when cancel switch 11 is turned ON, a transition is made from the constant headway distance control state to the deceleration support control state. As a result, the driver can easily select the control state corresponding to the running environment.

MODIFIED EXAMPLES (1) As explained above, the configuration is such that in the deceleration support control state, control of the amount of engine torque generated, control of the braking force by hydraulic brake 5a, and control of the application of operation reaction force to the accelerator pedal are performed. However, the present invention is not limited to this scheme. For example, application of an operation reaction force to the accelerator pedal is not a necessity. As a matter of fact, there is no need to perform all of the aforementioned control of the amount of engine torque generated, control of the braking force of hydraulic brake 5a, and control of the application of operation reaction force to the accelerator pedal. That is, a scheme can also be adopted in which at least one of the engine torque, braking force of the braking device, and operation reaction force generated at the accelerator pedal is controlled in the deceleration support control.

(2) In the above description, the configuration is such that by turning ON/OFF main switch 8, both the following control system and the deceleration support control system are turned ON/OFF. However, the present invention is not limited to this scheme. For example, a scheme can also be adopted in which a switch for turning ON/OFF the following control system (following control ON/OFF switch) and a switch for turning ON/OFF the deceleration support control system (deceleration support control ON/OFF switch) are respectively provided. When the following control ON/OFF switch and the deceleration support control ON/OFF switch are both turned ON, system controller 3 controls the various parts such that the state becomes the same as the state in which main switch 8 is turned ON. When both the following control ON/OFF switch and the deceleration support control ON/OFF switch are turned OFF, system controller 3 controls the various parts such that the state becomes the same as the state in which main switch 8 is turned OFF.

A scheme can also be adopted in which the following control ON/OFF switch alone is turned ON, and system controller 3 controls the various parts such that only the previously explained state transitions A, B, C, D, I, J, K shown in FIG. 7 are performed. A scheme can also be adopted in which the deceleration support control ON/OFF switch alone is turned ON, and system controller 3 controls the various parts such that only the previously explained transitions A, B, E, H shown in FIG. 7 are performed. A scheme can also be adopted in which, although main switch 8 is turned OFF, system controller 3 controls the various parts such that only the previously explained state transitions A, E, H shown in FIG. 7 are performed. That is, the following configuration can also be adopted: the configuration is such that when the ignition switch of the vehicle is turned to the accessory ON (ACC ON) state, power to the headway distance maintenance supporting system is turned ON, and by turning ON/OFF main switch 8, only the following control system is turned ON/OFF, and the deceleration support control is performed irrespective of whether main switch 8 is ON/OFF.

(3) A scheme can also be adopted in which when constant headway distance control is performed in the constant headway distance control state as explained above, deceleration support control is performed simultaneously. In this case, for example, for the control of vehicle deceleration by means of engine braking and hydraulic brake 5a, control is performed by means of the constant headway distance control, and for the control of application of an operation reaction force to the accelerator pedal, control is performed by means of the deceleration support control.

(4) In the above explanation, the various conditions for transition of the control state have been presented with reference to examples together with the purposes and reasons for making the transitions to the various control states. However, some of the listed conditions could be deleted, and other conditions could be added.

(5) In the above description, the configuration is such that when at least one of the conditions (7a)-(7d) is met while in the constant headway distance control state, system controller 3 controls the various parts such that a transition is made from the constant headway distance control state to the deceleration support control state (state transition G). However, the present invention is not limited to this scheme. For example, a scheme can also be adopted in which even when it is judged that the driver has depressed the accelerator pedal, the various parts are still controlled so that a transition is made from the constant headway distance control state to the deceleration support control state. When the driver depresses the accelerator pedal, such as when passing a preceding vehicle, the driver operation should be given priority. Consequently, the following scheme is preferred: during the period when it is judged that the driver has depressed the accelerator pedal for passing, constant headway distance control for controlling the headway distance should be cancelled. A scheme can also be adopted in which when there is no longer a judgment that the driver is depressing the accelerator pedal for passing or the like, a transition is back again to the constant headway distance control state.

Figure 12:
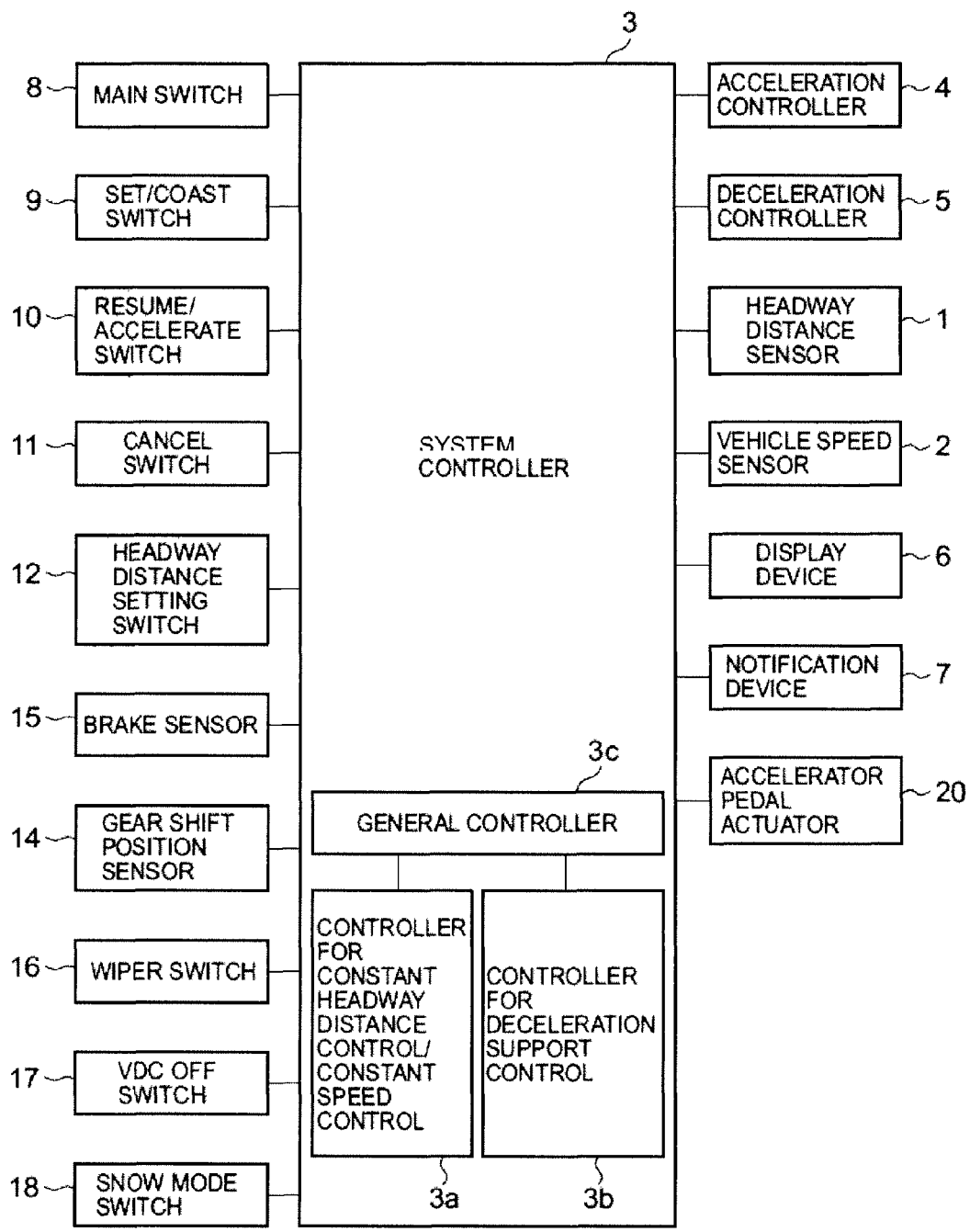
FIG. 12 is a block diagram showing the headway distance maintenance supporting system according to another embodiment of the present invention.

(6) As shown in the block diagram of FIG. 12, a scheme can also be adopted in which system controller 3 comprises controller 3a for constant headway distance control/constant speed control, controller 3b for deceleration support control, and general controller 3c that generalizes the control performed by controller 3a for constant headway distance control/constant speed control and controller 3b for deceleration support control. Controller 3a for constant headway distance control/constant speed control and general controller 3c perform the constant headway distance control or constant speed control. Controller 3b for deceleration support control and general controller 3c perform the deceleration support control.

(7) The embodiments and modified examples may be combined for use.

In the embodiment and modified examples, the running control means may correspond to acceleration controller 4, deceleration controller 5, display device 6, and notification device 7 of the following control system; and the deceleration control means may correspond to deceleration controller 5, display device 6, notification device 7, and accelerator pedal actuator 20 of the deceleration support control system. The running environment detecting means may correspond to headway distance sensor 1, vehicle speed sensor 2, wiper switch 16, VDC OFF switch 17, and snow mode switch 18. The operation detection means may correspond to main switch 8, set/coast switch 9, resume/accelerate switch 10, cancel switch 11, gear shift position sensor 14 and brake sensor 15. The system control means is realized by system controller 3 and the control program executed by system controller 3. Also, it should be pointed out that the aforementioned explanation is merely an example. The explanation of the present invention places no restrictions on the correspondence relationships between the descriptive items in the embodiment and the descriptive items in the claims.

Given the disclosure of the present invention, one versed in the art would appreciate that there may be other embodiments and modifications within the scope of the invention. Accordingly, all modifications attainable by one versed in the art from the present disclosure within the scope of the present invention are to be included as further embodiments of the present invention. The scope of the present invention is to be defined as set forth in the following claims.

What is claimed is:

1. A headway distance maintenance supporting system for a given vehicle, comprising:
    a running controller configured to perform constant headway distance control for following a preceding vehicle when the preceding vehicle is present, wherein the running controller comprises a deceleration controller configured to perform deceleration support control that supports deceleration of said given vehicle corresponding to a headway distance from said preceding vehicle;
    a running environment detector configured to detect a running environment of said given vehicle;
    an operation detector configured to detect an operation performed by a driver for adapting to the running environment of said given vehicle; and
    a system controller configured to detect a transitional state of the given vehicle based on the running environment of the given vehicle or the operation performed by the driver,
    wherein the system controller is further configured to control said running controller and said deceleration controller such that, when the system controller detects that the transitional state of said given vehicle is a prescribed transitional state, the constant headway distance control is released even when the constant headway distance control is being performed by said running controller, and the deceleration support control is performed, and
    wherein said system controller is configured such that the deceleration support control by the deceleration controller is not released while the constant headway distance control is released when said operation detector detects that the driver has instructed release of said constant headway distance control.

2. The headway distance maintenance supporting system according to claim 1, wherein the system controller is configured to detect the transitional state of said given vehicle as being the prescribed transitional state when said running environment detector detects one of a wheel rotating idly, the given vehicle running on a slippery road surface, said operation detector detecting an instruction for turning ON windshield wipers, and a gear shift position being set to any of neutral, reverse or park.

3. The headway distance maintenance supporting system according to claim 1, wherein said deceleration controller is configured to perform said deceleration support control by controlling at least one of an engine torque, a braking force of a brake, and an operation reaction force generated at an accelerator pedal.

4. The headway distance maintenance supporting system according to claim 1, wherein said system controller is configured to control said running controller such that said released constant headway distance control is restored when said operation detector detects that the driver has instructed said constant headway distance control to be restored.

5. The headway distance maintenance supporting system according to claim 1, wherein said system controller is configured to control said running controller and said deceleration controller such that said constant headway distance control and said deceleration support control are released when said operation detector detects that the driver has instructed that said constant headway distance control and said deceleration support control be released.

6. A headway distance maintenance supporting system for a given vehicle, comprising:
    a running controller configured to perform constant headway distance control for following a preceding vehicle when the preceding vehicle is present, wherein the running controller comprises a deceleration controller configured to perform deceleration support control that supports deceleration of said given vehicle corresponding to a headway distance from said preceding vehicle;
    a running environment detector configured to detect a running environment of said given vehicle;
    an operation detector configured to detect an operation performed by a driver for adapting to the running environment of said given vehicle; and
    a system controller configured to detect a transitional state of the given vehicle based on the running environment of the given vehicle or the operation performed by the driver,
    wherein the system controller is further configured to control said running controller and said deceleration controller such that, when the system controller detects that the transitional state of said given vehicle is a prescribed transitional state, the constant headway distance control is released even when the constant headway distance control is being performed by said running controller, and the deceleration support control is performed, and
    wherein said system controller is configured to control said deceleration controller such that said deceleration support control is temporarily paused when one of the following occurs: said running environment detector detects that the given vehicle is running on a slippery road surface, said operation detector detects a state in which a braking operation has been performed, and said operation detector detects a state in which there is an instruction that vehicle behavior control for stabilizing the given vehicle's behavior is not to be performed.

7. The headway distance maintenance supporting system according to claim 6, wherein said system controller is configured to control said deceleration controller such that said deceleration support control is restored when the cause for temporarily pausing said deceleration support control has disappeared.

8. A headway distance maintenance supporting system for a given vehicle, comprising:
- a running controller configured to perform constant headway distance control for following a preceding vehicle when the preceding vehicle is present, wherein the running controller comprises a deceleration controller configured to perform deceleration support control that supports deceleration of said given vehicle corresponding to a headway distance from said preceding vehicle;
- a running environment detector configured to detect a running environment of said given vehicle;
- an operation detector configured to detect an operation performed by a driver for adapting to the running environment of said given vehicle; and
- a system controller configured to control said running controller and said deceleration controller according to information from said running environment detector or said operation detector,
- wherein said system controller is further configured to judge whether an acceleration control performed to follow the preceding vehicle is inappropriate based on the running environment of said given vehicle or the operation performed by the driver and configured such that when the acceleration control is judged to be inappropriate, said running controller is controlled such that said constant headway distance control is released even when the constant headway distance control is being performed by said running controller, and said deceleration controller is controlled such that said deceleration support control is performed, and
- wherein said system controller is configured such that the deceleration support control by the deceleration controller is not released while the constant headway distance control is released when said operation detector detects that the driver has instructed release of said constant headway distance control.

9. A headway distance maintenance supporting system for a given vehicle, comprising:
- a running control means for performing constant headway distance control for following a preceding vehicle when the preceding vehicle is present, wherein the running control means comprises a deceleration control means for performing deceleration support control that supports deceleration of said given vehicle corresponding to a headway distance from said preceding vehicle;
- a running environment detection means for detecting a running environment of said given vehicle;
- an operation detection means for detecting an operation performed by a driver for adapting to the running environment of said given vehicle; and
- a system control means for detecting a transitional state of said given vehicle based on the running environment of said given vehicle or the operation performed by the driver, and for controlling said running control means and said deceleration control means such that, when the transitional state of said given vehicle is detected as a prescribed transitional state, said running control means is controlled such that said constant headway distance control is released even when the constant headway distance control is being performed by said running control means, and said deceleration control means is controlled such that said deceleration support control is performed,
- wherein said system control means is configured such that the deceleration support control by the deceleration control means is not released while the constant headway distance control is released when said operation detection means detects that the driver has instructed release of said constant headway distance control.

10. A headway distance maintenance supporting system for a given vehicle, comprising:
- a running control means for performing constant headway distance control for following a preceding vehicle when the preceding vehicle is present, wherein the running control means comprises a deceleration control means for performing deceleration support control that supports deceleration of said given vehicle corresponding to a headway distance from said preceding vehicle;
- a running environment detecting means for detecting a running environment of said given vehicle;
- an operation detecting means for detecting an operation performed by a driver for adapting to the running environment of said given vehicle; and
- a system control means for controlling said running control means and said deceleration control means according to information from said running environment detecting means or said operation detecting means,
- wherein said system control means judges whether an acceleration control performed to follow the preceding vehicle is inappropriate based on the running environment of said given vehicle or the operation performed by the driver,
- wherein said system control means controls such that, when the acceleration control is judged to be inappropriate, said running control means is controlled such that said constant headway distance control is released even when the constant headway distance control is being performed by said running control means, and said deceleration control means is controlled such that said deceleration support control is performed, and
- wherein said system control means is configured such that the deceleration support control by the deceleration control means is not released while the constant headway distance control is released when said operation detecting means detects that the driver has instructed release of said constant headway distance control.

11. A headway distance maintenance supporting method for a given vehicle, comprising:
- performing constant headway distance control for following a preceding vehicle when the preceding vehicle is present;
- performing deceleration support control that supports deceleration of said given vehicle corresponding to a headway distance from said preceding vehicle;
- detecting a running environment of said given vehicle;
- detecting an operation performed by a driver for adapting to the running environment of said given vehicle;
- detecting a transitional state of said given vehicle from a plurality of transitional states based on the running environment of said given vehicle or the operation performed by the driver; and controlling such that said constant headway distance control is released even when said constant headway distance control is being performed, and said deceleration support control is performed when the detected transitional state of said given vehicle is detected to be in a prescribed transitional state, wherein the deceleration support control is not released while the constant headway distance control is released when the driver has instructed release of said constant headway distance control.

12. A headway distance maintenance supporting method for a given vehicle, comprising:

performing constant headway distance control for following a preceding vehicle when the preceding vehicle is present;

performing deceleration support control that supports deceleration of said given vehicle corresponding to a headway distance from said preceding vehicle;

detecting a running environment of said given vehicle;

detecting an operation performed by a driver for adapting to the running environment of said given vehicle;

judging whether an acceleration control performed to follow the preceding vehicle is inappropriate based on the running environment of said given vehicle or the detected operation; and controlling such that said constant headway distance control is released even when said constant headway distance control is being performed, and said deceleration support control is performed when the acceleration control for performing acceleration to follow the preceding vehicle is judged to be inappropriate, and wherein the deceleration support control is not released while the constant headway distance control is released when the driver has instructed release of said constant headway distance control.

13. A computer readable storage medium, having stored data configured for providing headway distance maintenance support control for a given vehicle, wherein the computer readable storage medium stores a program for providing:

instructions for performing constant headway distance control for following a preceding vehicle when the preceding vehicle is present;

instructions for performing deceleration support control that supports deceleration of said given vehicle corresponding to a headway distance from said preceding vehicle;

instructions for detecting a running environment of said given vehicle;

instructions for detecting an operation performed by a driver for adapting to the running environment of said given vehicle;

instructions for detecting a transitional state of said given vehicle from a plurality of transitional states based on the running environment of said given vehicle or the operation performed by the driver;

instructions for controlling such that said constant headway distance control is released even when said constant headway distance control is being performed, and said deceleration support control is performed when the detected transitional state of said given vehicle is detected to be in a prescribed transitional state; and instructions for controlling such that the deceleration support control is not released while the constant headway distance control is released when the driver has instructed release of said constant headway distance control.

14. A computer readable storage medium, having stored data for headway distance maintenance support control for a given vehicle, wherein the computer readable storage medium stores a program for providing:

instructions for performing constant headway distance control for following a preceding vehicle when the preceding vehicle is present;

instructions for performing deceleration support control that supports deceleration of said given vehicle corresponding to a headway distance from said preceding vehicle;

instructions for detecting a running environment of said given vehicle;

instructions for detecting an operation performed by a driver for adapting to the running environment of said given vehicle;

instructions for judging whether an acceleration control performed to follow the preceding vehicle is inappropriate based on the running environment of said given vehicle or the detected operation;

instructions for controlling such that said constant headway distance control is released even when said constant headway distance control is being performed, and said deceleration support control is performed when the acceleration control for performing acceleration to follow the preceding vehicle is judged to be inappropriate; and instructions for controlling such that the deceleration support control is not released while the constant headway distance control is released when the driver has instructed release of said constant headway distance control.

* * * * *